(12) United States Patent
Yang et al.

(10) Patent No.: US 9,735,688 B2
(45) Date of Patent: Aug. 15, 2017

(54) ISOLATED POWER CONTROL DEVICE, POWER CONVERSION DEVICE AND ISOLATED POWER CONTROL METHOD USED IN POWER CONVERSION DEVICE

(71) Applicant: DELTA ELECTRONICS, INC., Taoyuan (TW)

(72) Inventors: Zhong-Wang Yang, Taoyuan (TW); Sheng-Li Lu, Taoyuan (TW); Wen-Hua Li, Taoyuan (TW); Qiong Zhang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 14/877,898

(22) Filed: Oct. 7, 2015

(65) Prior Publication Data

US 2016/0105117 A1   Apr. 14, 2016

(30) Foreign Application Priority Data

Oct. 11, 2014   (CN) .......................... 2014 1 0532975

(51) Int. Cl.
*H02M 3/335* (2006.01)
*H02M 1/00* (2006.01)

(52) U.S. Cl.
CPC ... *H02M 3/33523* (2013.01); *H02M 3/33569* (2013.01); *H02M 2001/0003* (2013.01)

(58) Field of Classification Search
CPC ......... H02M 3/33507; H02M 3/33592; H02M 3/33523; H02J 1/02
USPC .................. 363/21.12–21.18, 65; 307/82, 83
See application file for complete search history.

(56) References Cited

U.S. PATENT DOCUMENTS

| | | | |
|---|---|---|---|
| 7,505,702 B2 * | 3/2009 | Hong | G03G 15/80 363/41 |
| 8,587,970 B2 | 11/2013 | Uno et al. | |
| 2011/0103104 A1 * | 5/2011 | Zhan | H02M 3/33507 363/21.17 |
| 2011/0188270 A1 * | 8/2011 | Schmid | H02M 1/4208 363/21.12 |
| 2014/0016364 A1 * | 1/2014 | Chen | H02M 3/33507 363/21.02 |
| 2015/0155787 A1 * | 6/2015 | Chen | H02M 1/36 363/21.15 |

FOREIGN PATENT DOCUMENTS

| | | |
|---|---|---|
| CN | 101789698 A | 7/2010 |
| TW | M481439 U | 7/2014 |

\* cited by examiner

*Primary Examiner* — Nguyen Tran
(74) *Attorney, Agent, or Firm* — CKC & Partners Co., Ltd.

(57) ABSTRACT

An isolated power control device that includes an auxiliary isolated power circuit and a voltage level identification unit is provided. The auxiliary isolated power circuit includes a transformer module, a control module, and a switch module. The transformer module includes a primary side and a secondary side. The control module generates a switch control signal according to a primary side remote on/off control signal. The switch module is conducted according to the switch control signal to transmit an input auxiliary power signal to the primary side of the transformer module such that the auxiliary isolated power circuit generates a target voltage signal having a plurality of voltage levels. The voltage level identification unit receives the target voltage signal to output a secondary side remote on-off control signal to control a main isolated power device.

19 Claims, 11 Drawing Sheets

ISOLATED POWER CONTROL DEVICE, POWER CONVERSION DEVICE AND ISOLATED POWER CONTROL METHOD USED IN POWER CONVERSION DEVICE

RELATED APPLICATIONS

This application claims priority to China Application Serial Number 201410532975.9, filed Oct. 11, 2014, which is herein incorporated by reference.

BACKGROUND

Field of Invention

The present invention relates to a power technology. More particularly, the present invention relates to an isolated power control device, a power conversion device, and an isolated power control method used in a power conversion device.

Description of Related Art

The input and output of an isolated power supply are electrically connected through a magnetic device, such as a transformer. In the applications of power supply systems, it is usually required to control the on and off of power supplies through a remote on/off pin which is refer to the Vin− of the input side. As for an isolated power supply whose PWM control IC is refer to the Vo− of the output side, not only the magnetic device, such as a transformer, is required to implement the power isolation function, but the isolated signal-transmitting device is also required to implement the signal transmission of the remote on/off signal from the input side to the output side.

The commonly used isolated signal-transmission devices are mostly optical couplers. However, the optical couplers have a disadvantage of short lifetime. In addition, the control circuits in cooperation with the working framework of the optical couplers occupy areas of printed circuit boards.

For the forgoing reasons, there is a need to solve the above-mentioned problems by designing a new isolated power control device, which is also a problem that the relevant industry is eager to solve.

SUMMARY

An isolated power control device is provided. The isolated power control device comprises an auxiliary isolated power circuit and a voltage level identification unit. The auxiliary isolated power circuit comprises a transformer module, a control module, and a switch module. The transformer module has a primary side and a secondary side. The control module generates a switch control signal according to a primary side remote on/off control signal. The switch module is conducted according to the switch control signal to transmit an input auxiliary power signal to the primary side of the transformer module such that the auxiliary isolated power circuit generates a target voltage signal at the secondary side. The target voltage signal has a plurality of voltage levels. The voltage level identification unit receives the target voltage signal to output a secondary side remote on/off control signal so as to control a main isolated power device.

The invention provides a power conversion device. The power conversion device comprises an isolated power control device and a main isolated power device. The isolated power control device comprises an auxiliary isolated power circuit and a voltage level identification unit. The auxiliary isolated power circuit generates a target voltage signal according to a primary side remote on/off control signal. The target voltage signal has a plurality of voltage levels. The voltage level identification unit receives the target voltage signal to output a secondary side remote on/off control signal. The main isolated power device comprises a main isolated power circuit and a main control circuit. The main isolated power circuit comprises a primary circuit and a secondary circuit. The main control circuit is disposed on the side of the secondary circuit configured for receiving the secondary side remote on/off control signal. The main control circuit controls the switches of the main isolated power circuit to perform at high frequency when the secondary side remote on/off control signal is at a first voltage level. The main control circuit controls the switches of the main isolated power circuit to stop operating when the secondary side remote on/off control signal is at a second voltage level different from the first voltage level.

The invention further provides an isolated power control method used in a power conversion device. The power conversion device comprises an auxiliary isolated power circuit. The auxiliary isolated power circuit has a primary side and a secondary side isolated from each other. The isolated power control method comprises the following steps: providing a primary side remote on/off control signal to a control module of the auxiliary isolated power circuit to allow the control module to generate a switch control signal; providing the switch control signal to a switch module of the auxiliary isolated power circuit; opening or closing the switches of the switch module according to the switch control signal to generate a target voltage signal. The target voltage signal has a plurality of voltage levels; receiving the target voltage signal by a voltage level identification unit of the auxiliary isolated power circuit to output a secondary side remote on/off control signal so as to control a main isolated power device.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Figure 1:
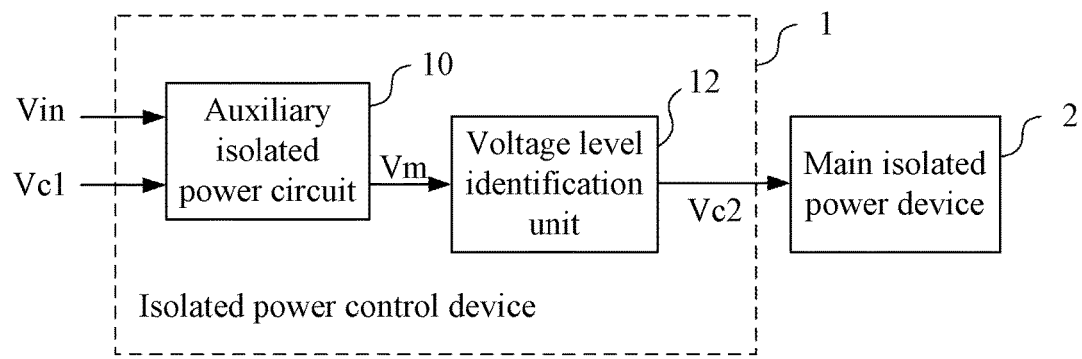
FIG. 1 is a block diagram of a power conversion device according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a block diagram of a power conversion device 1000 according to one embodiment of this invention. The power conversion device 1000 includes an isolated power control device 1 and a main isolated power device 2. The isolated power control device 1 includes an auxiliary isolated power circuit 10 and a voltage level identification unit 12.

The auxiliary isolated power circuit 10 is configured for receiving an input auxiliary power signal Vin and a primary side remote on/off control signal Vc1 to generate a secondary side target voltage signal Vm accordingly. The target voltage signal Vm has a plurality of voltage levels.

The voltage level identification unit 12 further generates a secondary side remote on/off control signal Vc2 according to the target voltage signal Vm. The secondary side remote on/off control signal Vc2 controls the main isolated power device 2. In one embodiment, a voltage range of the target voltage signal Vm is from 0 volt to 5 volts. In one embodiment, the voltage level identification unit 12 can be realized by an analog circuit. In one embodiment, the voltage level identification unit 12 can be realized by a digital circuit.

Figure 2:
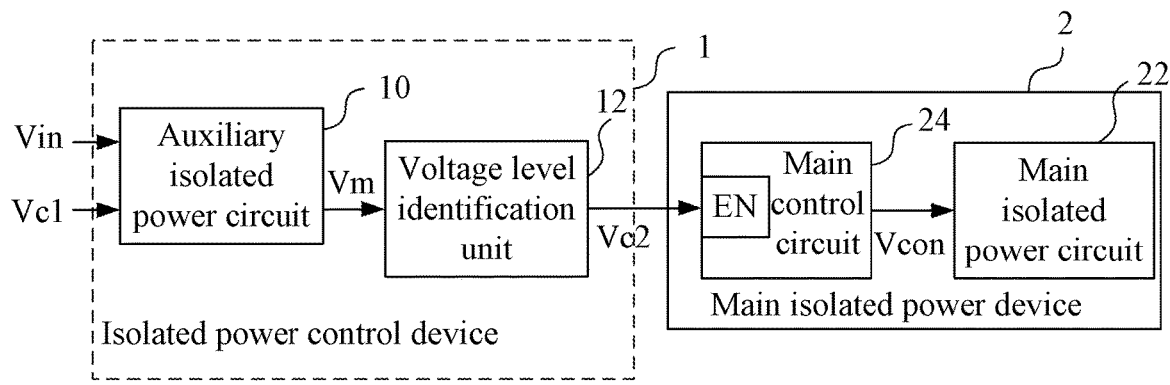
FIG. 2 is a detailed block diagram of the power conversion device in FIG. 1 according to one embodiment of this invention.

FIG. 2 is a detailed block diagram of the power conversion device 1000 in FIG. 1 according to one embodiment of this invention. In the present embodiment, the main isolated power device 2 includes a main isolated power circuit 22 and a main control circuit 24.

The main control circuit 24 is referring to secondary side, who receives the secondary side remote on/off control signal Vc2 to output a main isolated power circuit control signal Vcon so as to control the main isolated power circuit 22.

In one embodiment, when the primary side remote on/off control signal Vc1 is in a first state, the main control circuit 24 controls the switches of the main isolated power circuit 22 to perform at high frequency according to the main isolated power circuit control signal Vcon that is generated from the primary side remote on/off control signal Vc1 through the isolated power control device 1. When the primary side remote on/off control signal Vc1 is in a second state, the main control circuit 24 controls the switches of the main isolated power circuit 22 to stop operating according to the main isolated power circuit control signal Vcon that is generated from the primary side remote on/off control signal Vc1 through the isolated power control device 1.

In various embodiments, the main isolated power supply circuit 22 may be various electric circuits utilizing a transformer or any other isolation device to achieve electrical isolation and electrical energy conversion. The implementation of the main isolated power device 22 in the present invention is not limited to any specific configuration.

In one embodiment, the secondary side remote on/off control signal Vc2 may be transmitted to an enable pin En of the main control circuit 24 to control the startup or shutdown of the main control circuit 24. In other embodiments, the control of the main control circuit 24 by the secondary side remote on/off control signal Vc2 may be implemented by using other methods. Once a high state or a low state of the secondary side remote on/off control signal Vc2 is utilized to control the switches of the main isolated power circuit 22 to perform at high frequency switching or to stop operating, it is within the scope of the present invention.

A detailed description of various electric circuit modules in the isolated power control device 1 is provided as follows.

Figure 3:
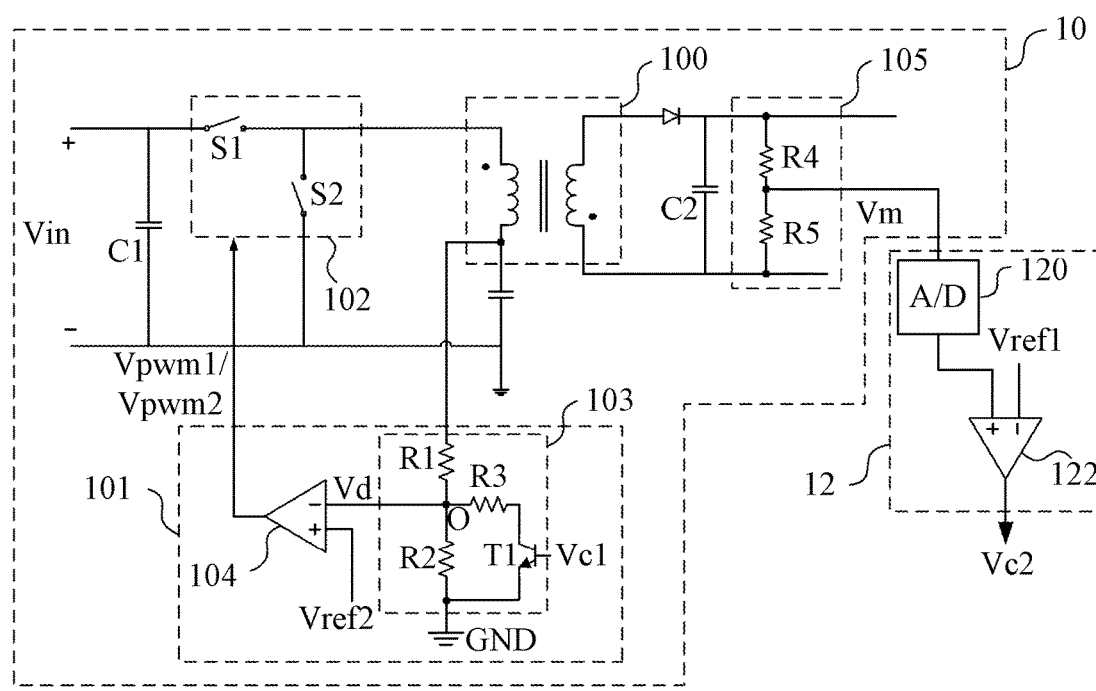
FIG. 3 is a detailed block diagram of an isolated power control device according to one embodiment of this invention.

FIG. 3 is a detailed block diagram of the isolated power control device 1 according to one embodiment of this invention.

The auxiliary isolated power circuit 10 includes: a transformer module 100, a control module 101, and a switch module 102. The transformer module 100 has a primary side and a secondary side.

The control module 101 includes: a voltage division unit 103 and a comparing unit 104. The voltage division unit 103 includes: a variable resistance unit and a first resistance unit R1. The variable resistance unit includes a second resistance unit R2, a third resistance unit R3, and a switch unit T1. The third resistance unit R3 and the switch unit T1 are connected in series first, and then are connected in parallel with the second resistance unit R2.

In one embodiment, the switch unit T1 is an N-type transistor to receive the primary side remote on/off control signal Vc1 so as to be conducted or not to be conducted accordingly. When the switch unit T1 is conducted, a first resistance value to which the variable resistance unit corresponds is equivalent to a resistance value of the second resistance unit R2 and the third resistance unit R3 connected in parallel. When the switch unit T1 is not conducted, a second resistance value to which the variable resistance unit corresponds is equivalent to a resistance value of the second resistance unit R2. Hence, the corresponding second resistance value of the variable resistance unit when the switch unit T1 is not conducted is larger than the corresponding first resistance value of the variable resistance unit when the switch unit T1 is conducted.

It is noted that, in other embodiments, the switch unit T1 may be other devices. For example, the switch unit T1 may be a P-type transistor so as to be conducted or not to be conducted according to the primary side remote on/off control signal Vc1.

The variable resistance unit is electrically connected between a voltage-dividing terminal O and a ground terminal GND. The first resistance unit R1 is electrically connected to the primary side of the transformer module 100 and the voltage-dividing terminal O. Hence, the first resistance unit R1 and the variable resistance unit generate a divided voltage Vd at the voltage-dividing terminal O according to the primary side remote on/off control signal Vc1. However, it is noted that, the first resistance unit R1 may be electrically connected between other voltage terminals and the voltage-dividing terminal O so as to generate the divided voltage Vd at the voltage-dividing terminal O according to a voltage at the voltage terminal in cooperation with the variable resistance unit in other embodiments.

The divided voltage Vd has a first divided voltage value V1 when the variable resistance unit outputs the first resistance value, and has a second divided voltage value V2 when the variable resistance unit outputs the second resistance value. Since the second resistance value is larger than the first resistance value, the second divided voltage value V2 of the divided voltage Vd is larger than the first divided voltage value V1.

The comparing unit 104 receives a second reference voltage Vref2 and the divided voltage Vd and compares the second reference voltage Vref2 with the divided voltage Vd so as to output a first pulse width modulation signal Vpwm1 or a second pulse width modulation signal Vpwm2 correspondingly. The first pulse width modulation signal Vpwm1 has a first duty ratio corresponding to the first divided voltage value V1. The second pulse width modulation signal Vpwm2 has a second duty ratio corresponding to the second divided voltage value V2. In this embodiment, a switch control signal received by the switch module 102 for controlling the operation thereof is either the first pulse width modulation signal Vpwm1 or the second pulse width modulation signal Vpwm2 mentioned above. In other embodiments, the switch control signal can be other types, such as, pulse frequency modulation (PFM) signal or phase-shift control signal.

It is noted that the above control module 101 only serves as an example. In other embodiments, other electric circuit structures may be used so as to generate the first pulse width modulation signal Vpwm1 or the second pulse width modulation signal Vpwm2 having different duty ratios according to the different primary side remote on/off control signals Vc1. The present invention is not limited to the structure of the present embodiment.

The switch module 102 is electrically connected to the primary side of the transformer module 100. In the present embodiment, the switch module 102 includes a switch S1 and a switch S2. In various embodiments, the switch module 102 may be realized by other method, and is not limited to the structure depicted in FIG. 3.

The switch S1 and the switch S2 can be opened or closed according to the first pulse width modulation signal Vpwm1 or the second pulse width modulation signal Vpwm2. When the switch S1 closed and the switch S2 opened, the transformer 100 is positive drive. When the switch S1 opened and the switch S2 are closed, the transformer 100 is reverse recovery.

In one embodiment, the auxiliary isolated power circuit 10 further includes a first capacitor C1 to provide the input auxiliary power signal Vin with support. Therefore, the switch module 102 can transmit the input auxiliary power signal Vin to the primary side of the transformer module 100 by way of the first capacitor C1.

Figure 5:
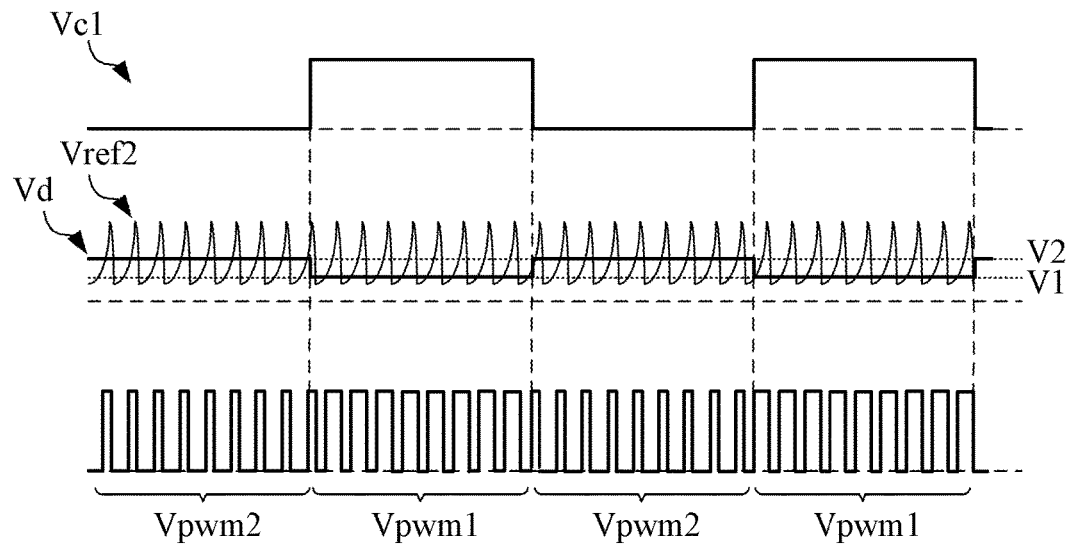
FIG. 5 is waveforms of a primary side remote on/off control signal, a divided voltage, a second reference voltage, a first pulse width modulation signal, and a second pulse width modulation signal according to one embodiment of this invention.

A description is provided with reference to FIG. 3 and FIG. 5. FIG. 5 is waveforms of the primary side remote on/off control signal Vc1, the divided voltage Vd, the second reference voltage Vref2, the first pulse width modulation signal Vpwm1, and the second pulse width modulation signal Vpwm2 according to one embodiment of this invention.

As shown in FIG. 5, when the primary side remote on/off control signal Vc1 is in the high state, the switch unit T1, which is an N-type transistor, is conducted. Therefore, the first resistance value to which the variable resistance unit corresponds renders the divided voltage Vd to be the first divided voltage value V1. When the primary side remote on/off control signal Vc1 is in the low state, the switch unit T1, which is the N-type transistor, is not conducted. Since the second resistance value to which the variable resistance unit corresponds is larger than the first resistance value, the second divided voltage value V2 to which the divided voltage Vd corresponds is larger than the first divided voltage value V1.

In the present embodiment, the second reference voltage Vref2 is a saw-tooth wave and is compared with the divided voltage Vd so as to output the high state of the first pulse width modulation signal Vpwm1 or the second pulse width modulation signal Vpwm2 when the second reference voltage Vref2 is larger than the divided voltage Vd and output the low state of the first pulse width modulation signal Vpwm1 or the second pulse width modulation signal Vpwm2 when the second reference voltage Vref2 is smaller than the divided voltage Vd by the comparing unit 104 in FIG. 3.

When the divided voltage Vd corresponds to the larger second divided voltage value V2, an interval during which the second reference voltage Vref2 is larger than the divided voltage Vd is smaller such that the second pulse width modulation signal Vpwm2 has a smaller duty ratio. That is, a time that the second pulse width modulation signal Vpwm2 outputs the high state during one period is shorter. Under the circumstances, energy of the input auxiliary power signal Vin fed into the transformer module 100 is less.

When the divided voltage Vd corresponds to the smaller first divided voltage value V1, the interval during which the second reference voltage Vref2 is larger than the divided voltage Vd is larger such that the first pulse width modulation signal Vpwm1 has a larger duty ratio. That is, a time that the first pulse width modulation signal Vpwm1 outputs the high state during a period is longer. Under the circumstances, the energy of the input auxiliary power signal Vin fed into the transformer module 100 is more.

The transformer module 100 further generates the corresponding energy in secondary winding 106 at the secondary side according to energy of the input auxiliary power signal Vin fed into the primary side such that the electric circuit at the secondary side generates the target voltage signal Vm accordingly.

The voltage level identification unit 12 includes an analog-to-digital conversion unit 120 and a comparing unit 122. The analog-to-digital conversion unit 120 is configured for converting the target voltage signal Vm from an analog form to a digital form. The comparing unit 122 further compares the target voltage signal Vm that has been converted to the digital form with a first reference voltage Vref1 to output the secondary side remote on/off control signal Vc2.

Figure 4:
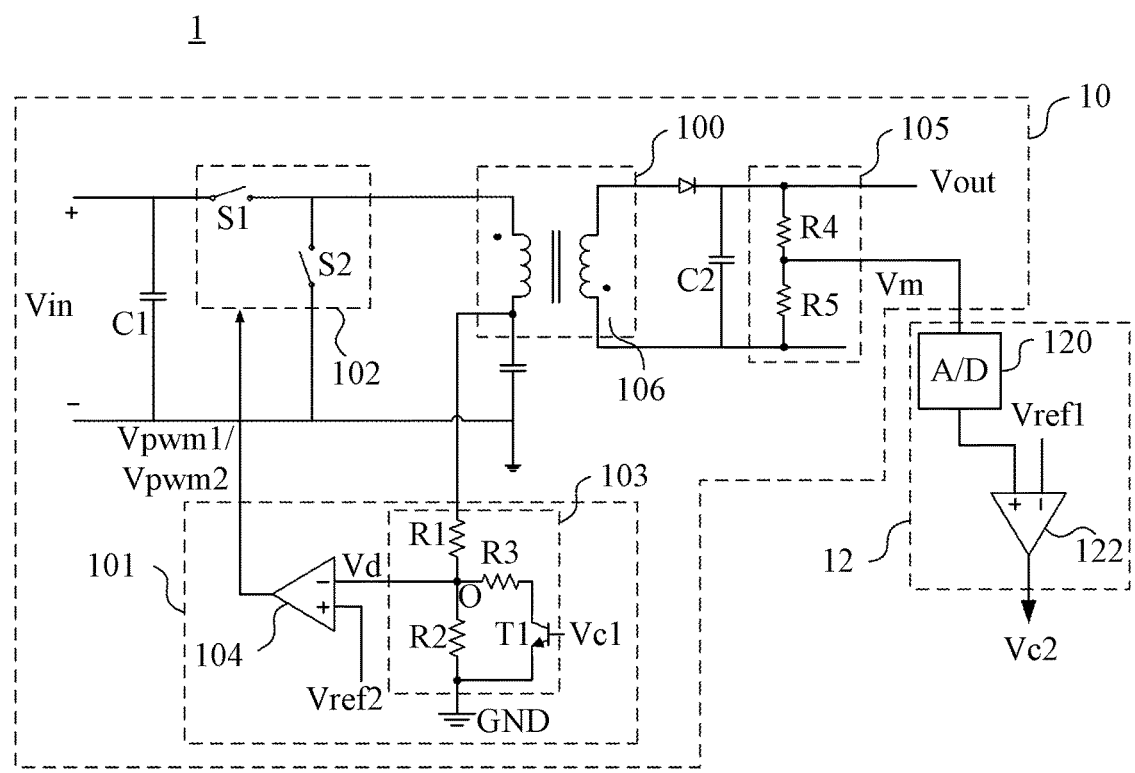
FIG. 4 is a detailed block diagram of an isolated power control device according to another embodiment of this invention.

FIG. 4 is a detailed block diagram of the isolated power control device 1 according to another embodiment of this invention. Since the components included in the isolated power control device 1 in FIG. 4 are similar to those included in the isolated power control device 1 in FIG. 3, a description in this regard is not provided.

In one embodiment, the transformer module 100 generates the corresponding energy at the secondary side according to the energy of the input auxiliary power signal Vin fed into the primary side so as to allow the electric circuit at the secondary side, as shown in FIG. 4, to simultaneously generate an output auxiliary power signal Vout and the target voltage signal Vm. The output auxiliary power signal Vout supplies power to the main control circuit 24. In one embodiment, a voltage range of the output auxiliary power signal Vout is from 0 volt to 20 volts.

In one embodiment, the auxiliary isolated power circuit 10 includes a second capacitor C2. The second capacitor C2 receives the energy transmitted from the secondary side of the transformer module 100, and then generates the output auxiliary power signal Vout and the target voltage signal Vm accordingly.

In another embodiment, the auxiliary isolated power circuit 10 includes an output voltage division module 105 electrically connected to the secondary side of the transformer module 100. The output voltage division module 105 includes a resistance unit R4 and a resistance unit R5 to divide the output auxiliary power signal Vout so as to generate the target voltage signal Vm.

Hence, similar to the previous embodiment, the analog-to-digital conversion unit 120 of the voltage level identification unit 12 converts the target voltage signal Vm from the analog form to the digital form. The comparing unit 122 of the voltage level identification unit 12 further compares the target voltage signal Vm that has been converted to the digital form with the first reference voltage Vref1 so as to output the secondary side remote on/off control signal Vc2.

Figure 6:
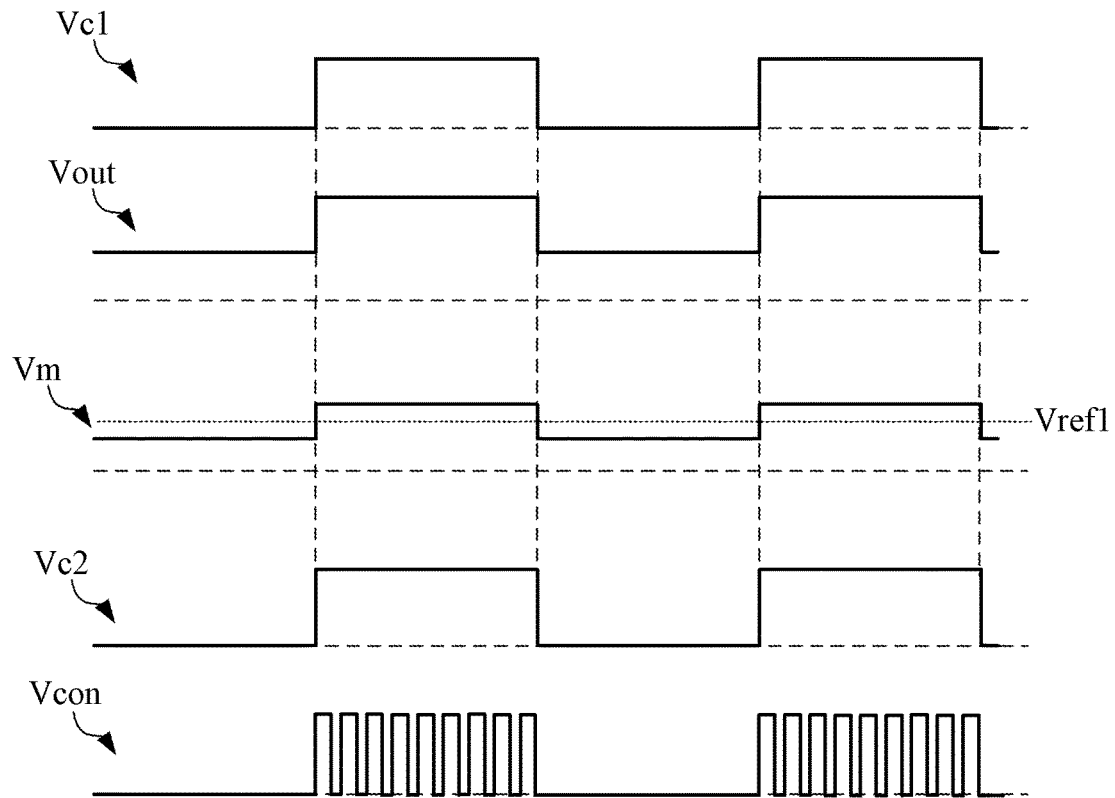
FIG. 6 is waveforms of a primary side remote on/off control signal, an output auxiliary power signal, a target voltage signal, a first reference voltage, a secondary side remote on/off control signal, and a main isolated power circuit control signal according to one embodiment of this invention.

A description is provided with reference to FIG. 4 and FIG. 6. FIG. 6 is waveforms of the primary side remote on/off control signal Vc1, the output auxiliary power signal Vout, the target voltage signal Vm, the first reference voltage Vref1, the secondary side remote on/off control signal Vc2, and the main isolated power circuit control signal Vcon according to one embodiment of this invention.

As mentioned previously, when the primary side remote on/off control signal Vc1 is in the low state, the energy of the input auxiliary power signal Vin fed into the transformer module 100 is less such that the output auxiliary power signal Vout generated by the transformer module 100 at the secondary side corresponds to a lower voltage level. The target voltage signal Vm generated according to the output auxiliary power signal Vout thus corresponds to the lower voltage level.

Conversely, when the primary side remote on/off control signal Vc1 is in the high state, the energy of the input auxiliary power signal Vin fed into the transformer module 100 is more such that the output auxiliary power signal Vout generated by the transformer module 100 at the secondary side corresponds to a higher voltage level. The target voltage signal Vm generated according to the output auxiliary power signal Vout thus corresponds to the higher voltage level.

In one embodiment, the target voltage signal Vm does not need to be generated by the divided voltage of the output auxiliary power signal Vout. Rather, the target voltage signal Vm may be generated by an output terminal (that is, the secondary side) of the auxiliary isolated power circuit 10, or even may be generated by any node in the auxiliary isolated power circuit 10 being able to output a signal having a plurality of voltage levels according to the high state and the low state of the primary side remote on/off control signal Vc1.

Figure 7:
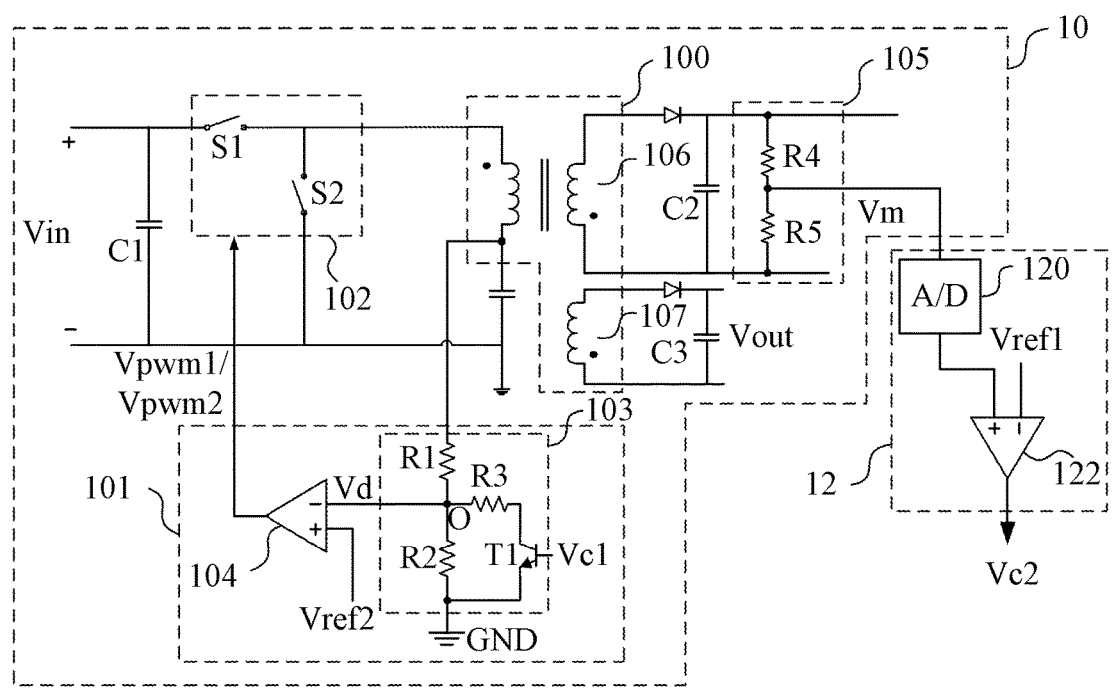
FIG. 7 is a detailed block diagram of an isolated power control device according to still another embodiment of this invention.

FIG. 7 is a detailed block diagram of the isolated power control device 1 according to still another embodiment of this invention. The devices included in the isolated power control device 1 in FIG. 7 are similar to those included in the isolated power control device 1 in FIG. 3. However, in the present embodiment, the transformer module 100 includes the secondary winding 106 and secondary winding 107 at the secondary side. The secondary winding 106 generates the target voltage signal Vm by way of the capacitor C2 and the output voltage division module 105. The secondary winding 107 generates the output auxiliary power signal Vout by way of capacitor C3.

A detailed description as to the generation of the secondary side remote on/off control signal Vc2 is provided as follows.

Figure 8:
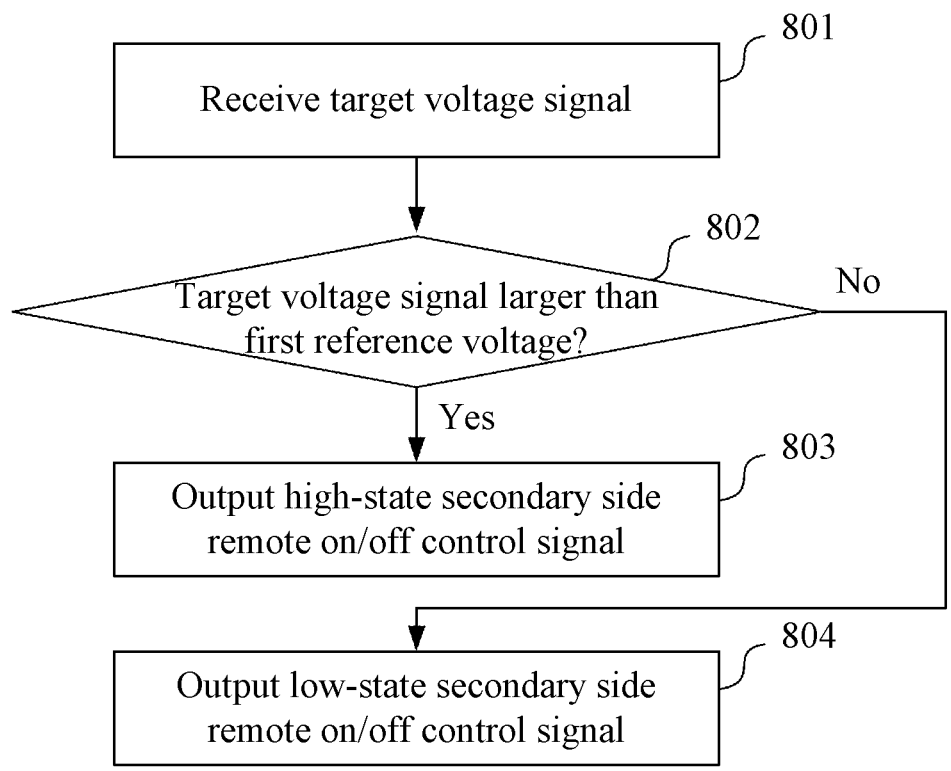
FIG. 8 is a flow chart of a workflow of a voltage level identification unit according to one embodiment of this invention.

A description is provided with reference to FIG. 7 and FIG. 8. FIG. 8 is a flow chart of a workflow 800 of the voltage level identification unit 12, especially the comparing unit 122 according to one embodiment of this invention. The workflow 800 includes the following steps (it should be understood that the sequence of the steps described in the present embodiment, unless otherwise specified, may be changed as required by practical needs, or the steps or part of the steps may be performed simultaneously).

In step 801, the target voltage signal Vm is received.

In step 802, whether the target voltage signal Vm is larger than the first reference voltage Vref1 is determined.

When the target voltage signal Vm is larger than the first reference voltage Vref1, the high-state secondary side remote on/off control signal Vc2 is outputted in step 803.

When the target voltage signal Vm is not larger than the first reference voltage Vref1, the low-state secondary side remote on/off control signal Vc2 is outputted in step 804.

Hence, the main control circuit 24 can output the different main isolated power circuit control signals Vcon according to the high state or the low state of the secondary side remote on/off control signal Vc2. In one embodiment, the secondary side remote on/off control signal Vc2 may be transmitted to the enable pin En of the main control circuit 24 so as to control the startup or shutdown of the main control circuit 24. In other embodiments, the control of the main control circuit 24 by the secondary side remote on/off control signal Vc2 may be realized in other form. Once the high state or the low state of the secondary side remote on/off control signal Vc2 is utilized to control the switches of the main isolated power circuit 22 to perform at high frequency or to stop operating, it is within the scope of the present invention.

In one embodiment, the main control circuit 24 generates the main isolated power circuit control signal Vcon to control the switches of the main isolated power circuit 22 depicted in FIG. 1 to perform at high frequency when starting up and to stop the main isolated power circuit 22 when shutting down.

It is noted that, in the present embodiment, a phase of the secondary side remote on/off control signal Vc2 and a phase of the primary side remote on/off control signal Vc1 are substantially the same so as to control the main control circuit 24 corresponding to timing of the primary side remote on/off control signal Vc1. The above "substantially" refers to that an error within an allowable range may exist between the phase of the secondary side remote on/off control signal Vc2 and the phase of the primary side remote on/off control signal Vc1 due to transmission process. Thus, the phase of the secondary side remote on/off control signal Vc2 and the phase of the primary side remote on/off control signal Vc1 are not necessarily completely the same.

In the above embodiment, the main control circuit 24 starts up and shuts down respectively according to the high state and the low state of the secondary side remote on/off control signal Vc2. However, in other embodiments, the secondary side remote on/off control signal Vc2 may control the main control circuit 24 according to opposite logic through an appropriate logic adjustment. That is, the main control circuit 24 starts up according to the low state of the secondary side remote on/off control signal Vc2, and shuts down according to the high state of the secondary side remote on/off control signal Vc2.

In the above embodiment, the main isolated power circuit control signal Vcon controls the switches of the main isolated power circuit 22 to perform at high frequency when the secondary side remote on/off control signal Vc2 is at a first voltage level, and controls the switches of the main isolated power circuit 22 to stop operating when the secondary side remote on/off control signal Vc2 is at a second voltage level. In one embodiment, the first voltage level is higher than the second voltage level. For example, the first voltage level is the high state, and the second voltage level is the low state. In one embodiment, the second voltage level is higher than the first voltage level, the first voltage level is the low state, and the second voltage level is the high state.

In the above embodiment, when the target voltage signal Vm is larger than the first reference voltage Vref1, the high-state secondary side remote on/off control signal Vc2 is outputted in step 803. When the target voltage signal Vm is not larger than the first reference voltage Vref1, the low-state secondary side remote on/off control signal Vc2 is outputted in step 804. However, through an appropriate logic adjustment, the low-state secondary side remote on/off control signal Vc2 may be output in step 803 when the target voltage signal Vm is larger than the first reference voltage Vref1. The high-state secondary side remote on/off control signal Vc2 may be output in step 804 when the target voltage signal Vm is not larger than the first reference voltage Vref1 in other embodiments.

Hence, the isolated power control device 1 according to one embodiment of the present embodiment can directly generate the secondary side remote on/off control signal Vc2 at the second side of the transformer module 100 according to the primary side remote on/off control signal Vc1, and control the main control circuit 24 to output the different main isolated power circuit control signals Vcon according to the secondary side remote on/off control signal Vc2. Therefore, the isolated power control device 1 does not need to dispose the signal transmission device between the primary side and the secondary side used for transmitting the switch signal for manipulating the control circuit. Not only is the isolated power control device 1 not limited to the lifetime of the signal transmission device, but the circuit area of the isolated power control device 1 is also decreased.

Figure 9:
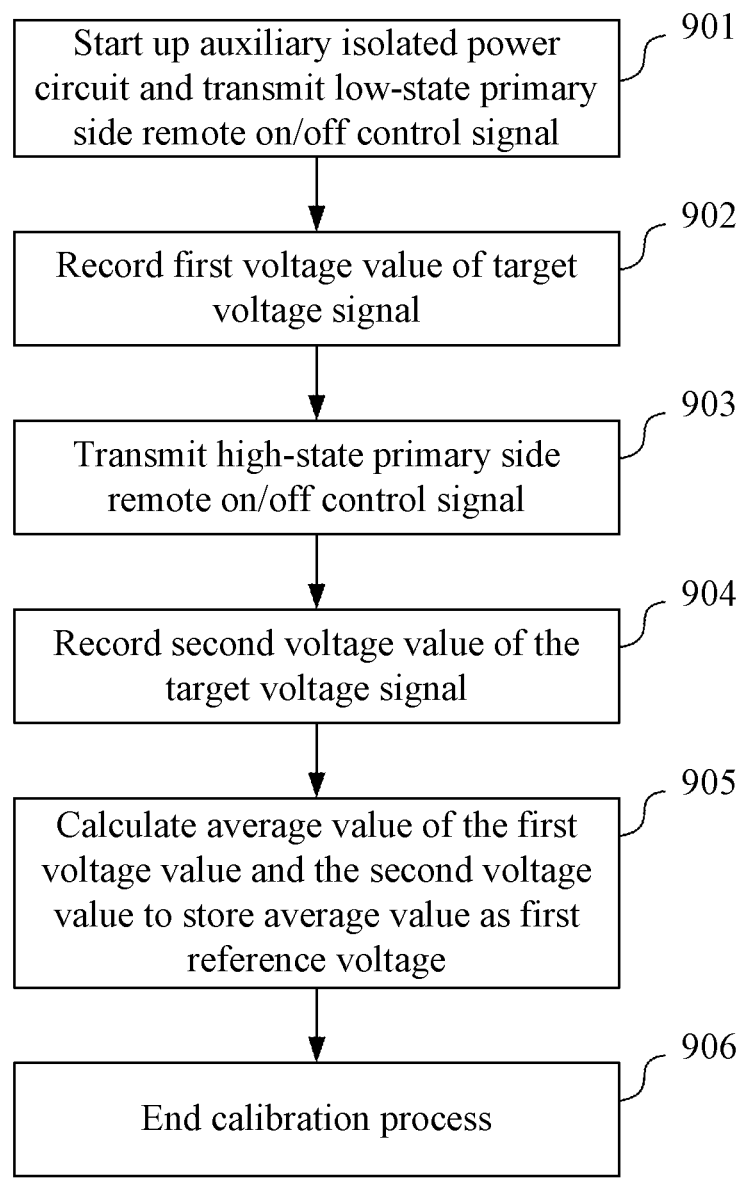
FIG. 9 is a flow chart of a calibration flow of a voltage level identification unit according to one embodiment of this invention.

FIG. 9 is a flow chart of a calibration flow 900 of the voltage level identification unit 12 according to one embodiment of this invention. In one embodiment, the voltage level identification unit 12 performs the calibration process 900 shown in FIG. 9 during the design or manufacturing process of the auxiliary isolated power circuit 10 to set the first reference voltage Vref1. The calibration process 900 includes the following steps (it should be understood that the sequence of the steps described in the present embodiment, unless otherwise specified, may be changed as required by practical needs, or the steps or part of the steps may be performed simultaneously).

In step 901, the auxiliary isolated power circuit 10 is started up and the low-state primary side remote on/off control signal Vc1 is transmitted.

In step 902, a first voltage value of the target voltage signal Vm is recorded corresponding to the low-state primary side remote on/off control signal Vc1.

In step 903, the high-state primary side remote on/off control signal Vc1 is transmitted.

In step 904, a second voltage value of the target voltage signal Vm is recorded corresponding to the high-state primary side remote on/off control signal Vc1.

In step 905, an average value of the first voltage value and the second voltage value are calculated to store the average value as the first reference voltage Vref1.

In step 906, the calibration process 900 is ended.

Figure 10:
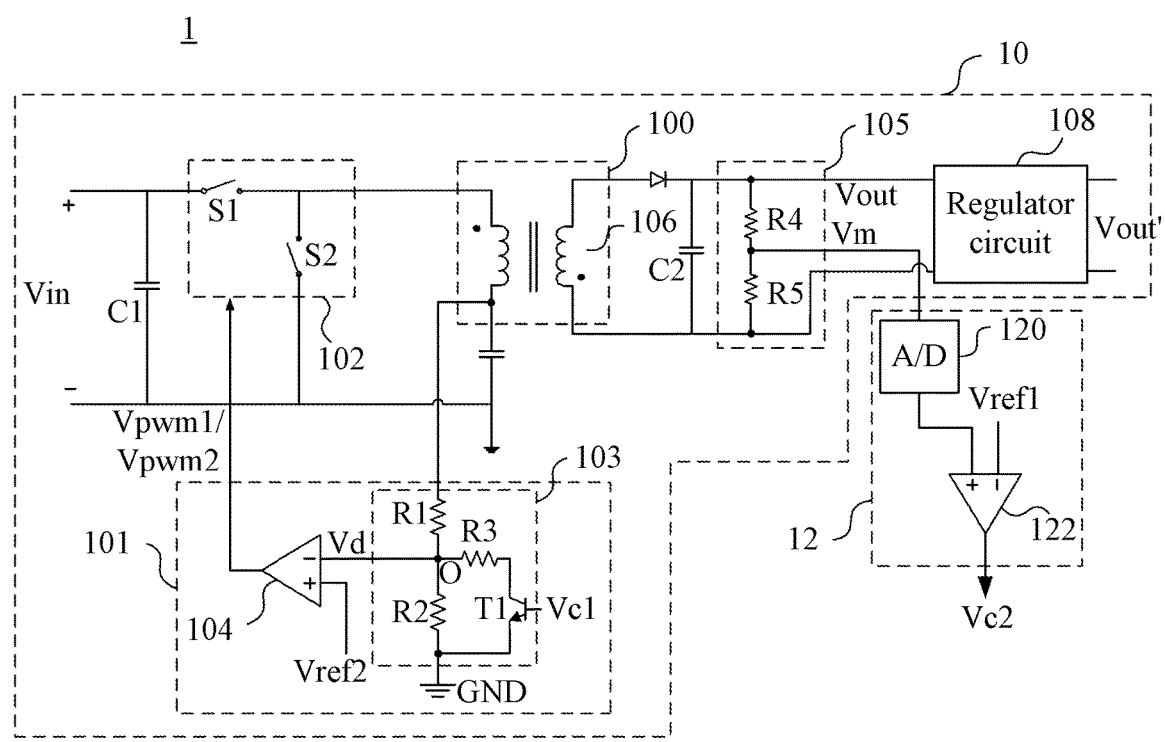
FIG. 10 is a block diagram of an isolated power control device according to yet another embodiment of this invention.
Figure 11:
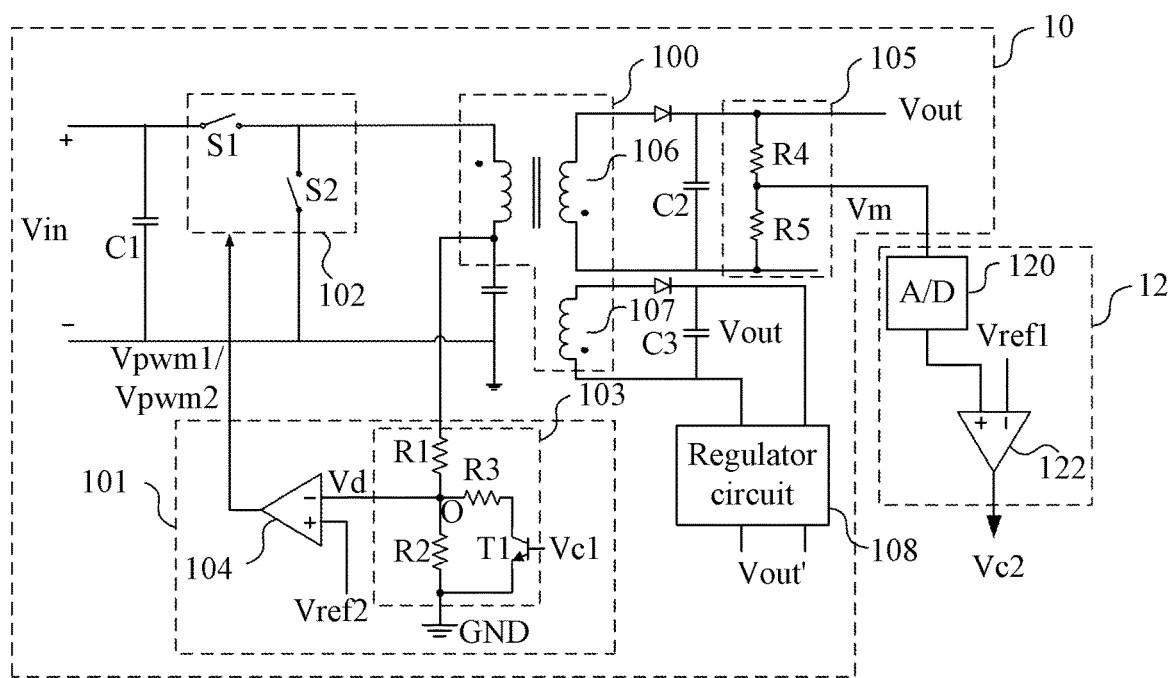
FIG. 11 is a block diagram of an isolated power control device according to another embodiment of this invention.

FIG. 10 is a block diagram of the isolated power control device 1 according to yet another embodiment of this invention. FIG. 11 is a block diagram of the isolated power control device 1 according to another embodiment of this invention. Since the electric circuit devices included in the isolated power control device 1 in FIG. 10 are similar to those included in the isolated power control device 1 in FIG. 4, and the electric circuit devices included in the isolated power control device 1 in FIG. 11 are similar to those included in the isolated power control device 1 in FIG. 7, a description of the same electric circuit devices is not provided. The isolated power control device 1 includes: the auxiliary isolated power circuit 10, the voltage level identification unit 12, and a regulator circuit 108 according to the present embodiments.

As mentioned previously, the switch module 102 is conducted according to the first pulse width modulation signal Vpwm1 or the second pulse width modulation signal Vpwm2 generated by the control module 101 to transmit the input auxiliary power signal Vin to the primary side of the transformer module 100. Therefore, the output auxiliary power signal Vout generated by the secondary side of the transformer module 100 actually has a similar waveform as the output auxiliary power signal Vout depicted in FIG. 6 but has a different level from the output auxiliary power signal Vout depicted in FIG. 6. In order to provide the main control circuit 24 and other electric circuits with a stable supply voltage, the regulator circuit 108 can regulate the output auxiliary power signal Vout having different levels so as to output a stable direct current output auxiliary power signal Vout' to the main control circuit 24.

It is noted that the regulator circuit 108 may be realized in any structure, and the present invention is not limited to a specific structure of the regulator circuit.

In addition, except for being supplied to the main control circuit 24, the direct current output auxiliary power signal Vout' generated by the regulator circuit 108 may also be supplied to other functional module that requires the power supply having the same voltage level. The present invention is not limited to supplying the direct current output auxiliary power signal Vout' to the main control circuit 24.

Figure 12:
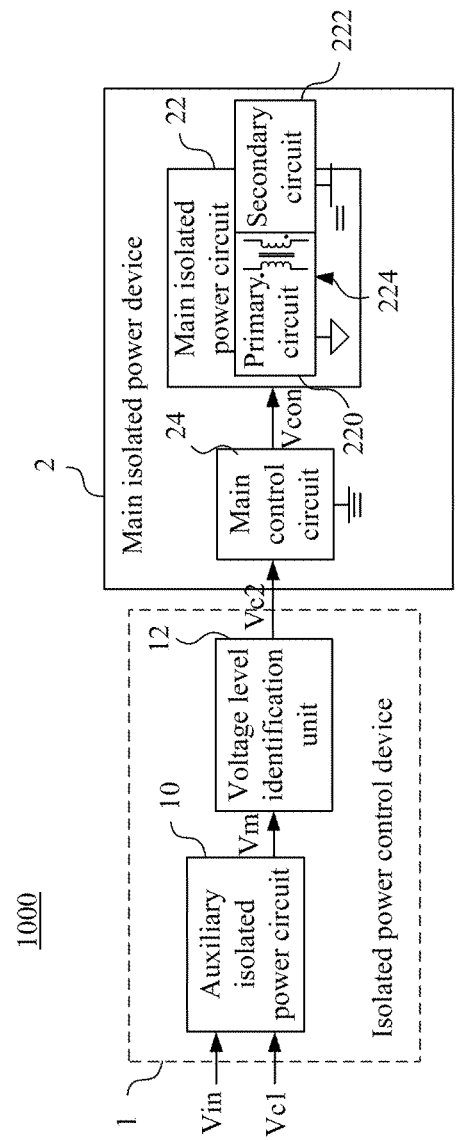
FIG. 12 is a detailed block diagram of the power conversion device in FIG. 1 according to another embodiment of this invention.

FIG. 12 is a detailed block diagram of the power conversion device 1000 in FIG. 1 according to another embodiment of this invention. In the present embodiment, the main isolated power device 2 includes the main isolated power circuit 22 and the main control circuit 24. In greater detail, the main isolated power circuit 22 includes a primary circuit 220, a secondary circuit 222, and a transformer module 224. The main control circuit 24 is actually disposed on a same side as the secondary circuit 222 such that a same ground symbol is depicted. Similar to the previous embodiment, the main control circuit 24 can receive the secondary side remote on/off control signal Vc2 to control the switches of the main isolated power circuit 22 to perform at high frequency or to stop operating.

Figure 13:
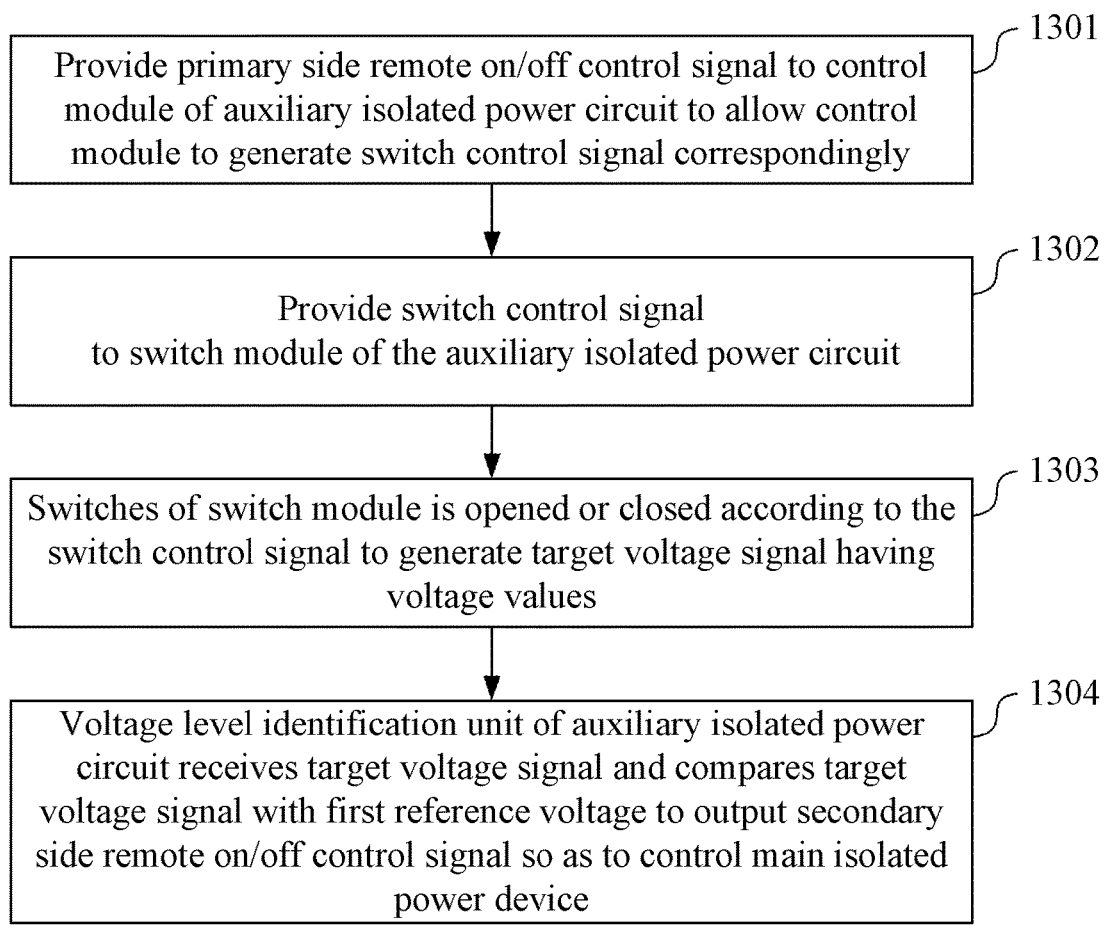
FIG. 13 is a flow chart of an isolated power control method according to one embodiment of this invention.

FIG. 13 is a flow chart of an isolated power control method 1300 according to one embodiment of this invention. The isolated power control method 1300 may be applied to the power conversion device 1000 shown in FIG.

1, FIG. 2, and FIG. 12. The isolated power control method 1300 includes the following steps.

In step 1301, the primary side remote on/off control signal Vc1 is provided to the control module 101 of the auxiliary isolated power circuit 10 to allow the control module 101 to generate a switch control signal correspondingly.

In step 1302, the switch control signal is provided to the switch module 102 of the auxiliary isolated power circuit 1.

In step 1303, the switches of the switch module 102 is opened or closed according to the switch control signal to generate the target voltage signal Vm. The target voltage signal Vm has a plurality of voltage levels according to a working state of the primary side remote on/off control signal Vc1.

In step 1304, the voltage level identification unit 12 of the auxiliary isolated power circuit 1 receives the target voltage signal Vm and compares the target voltage signal Vm with the first reference voltage Vref1 to output the secondary side remote on/off control signal Vc2 so as to control the main isolated power device 2.

The switch control signal can be pulse width modulation signal, pulse frequency modulation signal or phase-shift control signal.

When the primary side remote on/off control signal Vc1 is in the first state, the switches of the main isolated power circuit 22 performs at high frequency. When the primary side remote on/off control signal Vc1 is in the second state, the switches of the main isolated power circuit 22 stops operating.

The control module 101 outputs the switch control signal correspondingly according to a working state of the primary side remote on/off control signal Vc1.

The auxiliary isolated power circuit 10 outputs the target voltage signal Vm having a voltage value correspondingly according to the working state of the primary side remote on/off control signal Vc1.

The voltage level identification unit 12 respectively records a first voltage value and a second voltage value to which the target voltage signal Vm corresponds when the primary side remote on/off control signal Vc1 is in the first state and in the second state, and stores an average value of the first voltage value and second voltage value as the first reference voltage.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An isolated power control device comprising:
   an auxiliary isolated power circuit comprising:
   a transformer module having a primary side and a secondary side;
   a control module generating a switch control signal according to a primary side remote on/off control signal; and
   a switch module being conducted according to the switch control signal to transmit an input auxiliary power signal to the primary side of the transformer module such that the auxiliary isolated power circuit generates a target voltage signal at the secondary side, the target voltage signal having a plurality of voltage levels; and
   a voltage level identification unit configured for receiving the target voltage signal to output a secondary side remote on/off control signal so as to control a main isolated power device,
   wherein the main isolated power device comprises a main control circuit and a main isolated power circuit, the main control circuit controls the switches of the main isolated power circuit to perform at high frequency when the primary side remote on/off control signal is in a first state, and the main control circuit controls the switches of the main isolated power circuit to stop operating when the primary side remote on/off control signal is in a second state.

2. The isolated power control device of claim 1, wherein the control module outputs a first switch control signal when the primary side remote on/off control signal is in a first state, the control module outputs a second switch control signal when the primary side remote on/off control signal is in a second state.

3. The isolated power control device of claim 1, wherein an output terminal of the auxiliary isolated power circuit generates the target voltage signal having a first voltage value when the primary side remote on/off control signal is in a first state, the output terminal of the auxiliary isolated power circuit generates the target voltage signal having a second voltage value when the primary side remote on/off control signal is in a second state.

4. The isolated power control device of claim 1, wherein the voltage level identification unit generates the secondary side remote on/off control signal having a first voltage level when the target voltage signal is larger than a first reference voltage such that the switches of the main isolated power circuit performs at high frequency, the voltage level identification unit generates the secondary side remote on/off control signal having a second voltage level different from the first voltage level when the target voltage signal is not larger than the first reference voltage such that the switches of the main isolated power circuit stops operating.

5. The isolated power control device of claim 3, wherein the voltage level identification unit generates the secondary side remote on/off control signal having a first voltage level when the target voltage signal is larger than a first reference voltage such that the switches of the main isolated power circuit performs at high frequency, the voltage level identification unit generates the secondary side remote on/off control signal having a second voltage level different from the first voltage level when the target voltage signal is not larger than the first reference voltage such that the switches of the main isolated power circuit stops operating.

6. The isolated power control device of claim 1, wherein the voltage level identification unit generates the secondary side remote on/off control signal having a first voltage level when the target voltage signal is not larger than a first reference voltage such that the switches of the main isolated power circuit performs at high frequency switching, the voltage level identification unit generates the secondary side remote on/off control signal having a second voltage level different from the first voltage level when the target voltage signal is larger than the first reference voltage such that the switches of the main isolated power circuit stops operating.

7. The isolated power control device of claim 3, wherein the voltage level identification unit generates the secondary side remote on/off control signal having a first voltage level when the target voltage signal is not larger than a first reference voltage such that the switches of the main isolated power circuit performs at high frequency switching, the voltage level identification unit generates the secondary side remote on/off control signal having a second voltage level different from the first voltage level when the target voltage signal is larger than the first reference voltage such that the switches of the main isolated power circuit stops operating.

8. The isolated power control device of claim 1, wherein the secondary side of the transformer module comprises a secondary winding and an output voltage division module, the output voltage division module is electrically connected to the secondary winding, the secondary winding of the auxiliary isolated power circuit generates an output auxiliary power signal, and the target voltage signal is generated at the output voltage division module, wherein the auxiliary isolated power circuit further comprises a regulator circuit configured for receiving the output auxiliary power signal so as to generate a direct current output auxiliary power signal.

9. The isolated power control device of claim 1, wherein the secondary side of the transformer module comprises a first secondary winding and a second secondary winding, the first secondary winding of the auxiliary isolated power circuit generates an output auxiliary power signal, and the target voltage signal is generated at the second secondary winding, wherein the auxiliary isolated power circuit further comprises a regulator circuit configured for receiving the output auxiliary power signal so as to generate a direct current output auxiliary power signal.

10. The isolated power control device of claim 1, wherein the voltage level identification unit respectively records a first voltage value and a second voltage value to which the target voltage signal corresponds when the primary side remote on/off control signal is in a first state and in a second state, and stores an average value of the first voltage value and second voltage value as a first reference voltage.

11. The isolated power control device of claim 1, wherein the voltage level identification unit configured for comparing the target voltage signal with a first reference voltage to output a secondary side remote on/off control signal so as to control the main isolated power device.

12. A power conversion device comprising:
a main isolated power device; and
an isolated power control device comprising:
an auxiliary isolated power circuit comprising: a transformer module having a primary side and a secondary side; a control module generating a switch control signal according to a primary side remote on/off control signal; and a switch module being conducted according to the switch control signal to transmit an input auxiliary power signal to the primary side of the transformer module such that the auxiliary isolated power circuit generates a target voltage signal at the secondary side, the target voltage signal having a plurality of voltage levels; and
a voltage level identification unit configured for receiving the target voltage signal to output a secondary side remote on/off control signal so as to control the main isolated power device,
wherein the main isolated power device comprises a main control circuit and a main isolated power circuit, the main control circuit controls the switches of the main isolated power circuit to perform at high frequency when the primary side remote on/off control signal is in a first state, and the main control circuit controls the switches of the main isolated power circuit to stop operating when the primary side remote on/off control signal is in a second state.

13. The power conversion device of claim 12, wherein the secondary side of the transformer module of the auxiliary isolated power circuit comprises a secondary winding and an output voltage division module, the output voltage division module is electrically connected to the secondary winding, the secondary winding of the auxiliary isolated power circuit generates an output auxiliary power signal, and the target voltage signal is generated at the output voltage division module.

14. The power conversion device of claim 12, wherein the secondary side of the transformer module of the auxiliary isolated power circuit comprises a first secondary winding and a second secondary winding, the first secondary winding of the auxiliary isolated power circuit generates an output auxiliary power signal, and the target voltage signal is generated at the second secondary winding.

15. The power conversion device of claim 13, wherein the auxiliary isolated power circuit further comprises a regulator circuit connected to the secondary winding for receiving the output auxiliary power signal so as to generate a direct current output auxiliary power signal.

16. The power conversion device of claim 14, wherein the auxiliary isolated power circuit further comprises a regulator circuit connected to the first secondary winding for receiving the output auxiliary power signal so as to generate a direct current output auxiliary power signal.

17. The power conversion device of claim 12, wherein the voltage level identification unit respectively records a first voltage value and a second voltage value to which the target voltage signal corresponds when the primary side remote on/off control signal is in a first state and in a second state, and stores an average value of the first voltage value and second voltage value as a first reference voltage.

18. An isolated power control method applied to an isolated power control device comprising an auxiliary isolated power circuit and a voltage level identification unit, the auxiliary isolated power circuit comprising a transformer module having a primary side and a secondary side, a control module and a switch module, and the isolated power control method comprising the following steps:
using the control module for generating a switch control signal according to a primary side remote on/off control signal, and the switch module being conducted according to the switch control signal to transmit an input auxiliary power signal to the primary side of the transformer module such that the auxiliary isolated power circuit generates a target voltage signal at the secondary side, the target voltage signal having a plurality of voltage levels; and
using the voltage level identification unit for receiving the target voltage signal to output a secondary side remote on/off control signal so as to control a main isolated power device, wherein the main isolated power device comprises a main control circuit and a main isolated power circuit, the main control circuit controls the switches of the main isolated power circuit to perform at high frequency when the primary side remote on/off control signal is in a first state, and the main control circuit controls the switches of the main isolated power circuit to stop operating when the primary side remote on/off control signal is in a second state.

19. The isolated power control method of claim 18, wherein the voltage level identification unit respectively records a first voltage value and a second voltage value to which the target voltage signal corresponds when the primary side remote on/off control signal is in a first state and in a second state, and stores an average value of the first voltage value and second voltage value as a first reference voltage.

* * * * *